United States Patent
Price

[15] 3,641,716
[45] Feb. 15, 1972

[54] BEARING-GRINDING MACHINE

[72] Inventor: Daniel J. Price, R.D. #1, Thomasville, Pa. 17367

[22] Filed: May 19, 1970

[21] Appl. No.: 38,764

[52] U.S. Cl. .................................................. 51/241 R
[51] Int. Cl. ................................................. B24b 19/00
[58] Field of Search ............... 51/241 R, 241 B, 241 A, 241 S

[56] References Cited

UNITED STATES PATENTS

| | | | |
|---|---|---|---|
| 2,675,655 | 4/1954 | Strait | 51/241 B |
| 1,860,846 | 5/1932 | Watt | 51/241 B |
| 3,134,202 | 5/1964 | Hoefler | 51/241 |
| 2,818,695 | 1/1958 | Lockwood | 51/241 B |

*Primary Examiner*—William R. Armstrong
*Attorney*—C. Hercus Just

[57] ABSTRACT

A grinding machine for grinding exterior bearing surfaces on the outer ends of axle housings of trucks, trailers and similar automotive vehicles which have been repaired by restoring worn surfaces to original sizes by adding metal thereto by welding procedures, the grinding machine being capable of being positioned relative to the housing or axle being repaired, whether the same is still mounted on the vehicle or removed therefrom, and operable to rotate a grinding wheel about the axis of the bearing and also move it longitudinally along said axis to form a renewed bearing surface of precise dimensions.

8 Claims, 5 Drawing Figures

INVENTOR.
DANIEL J. PRICE
BY
ATTORNEY

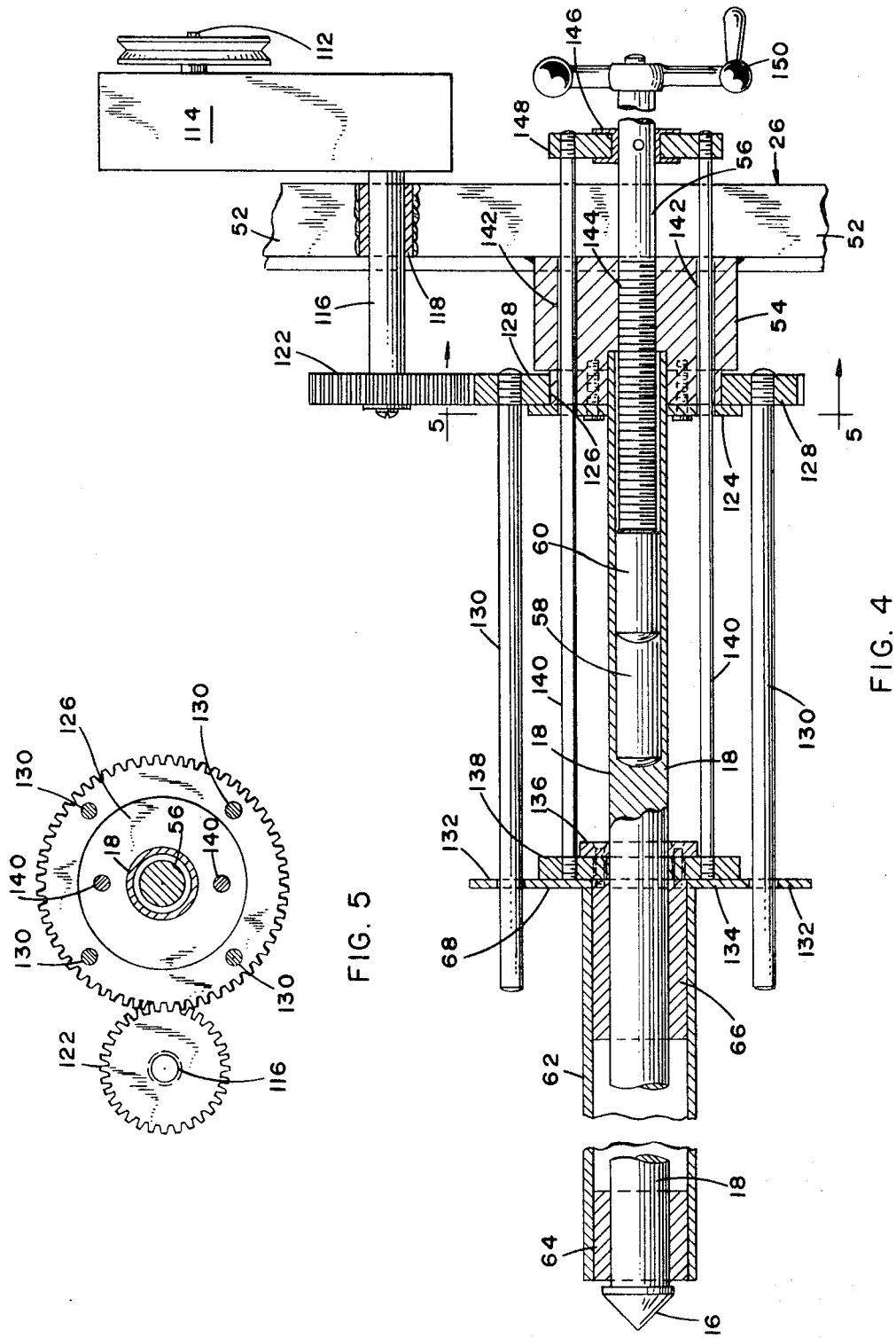

BEARING-GRINDING MACHINE

BACKGROUND OF THE INVENTION

The present economy of the nation is very largely involved with the trucking industry, including both trucks as well as tractor-trailer units. The rear wheels of such trucks and units rotate about a fixed axis of various types. If the wheels are of the driven type, they are supported by bearings rotatable about the outer ends of housings within which axles are rotatably mounted. If the wheels are mounted upon the rear or end portions of trailers of tractor-trailer units, they are supported by roller bearings mounted upon the outer cylindrical end portions of heavy-duty axles which are of a hollow nature.

Roller bearings and any other types of bearings which rotatably support the rear wheels of either trucks, the tractors of tractor-trailer units, or the trailers of tractor-trailer units are subjected to heavy loads and corresponding hard use for many thousands of successive miles. To attempt to minimize the wear upon such bearings, they require reasonable lubrication.

Although it is possible to check quite readily as to whether lubricating oil is available for the bearings, it is not uncommon for trucks and tractor-trailer units to be run long distances without inspection or attention relative to lubrication. This results in the bearings being damaged and/or completely destroyed. Very high temperatures are encountered under such circumstances and this situation not infrequently results in the outer bearing surfaces of the axles and axle housings of trucks and tractor-trailer units becoming abnormally worn and/or misshapen so that they are completely unsuited for the reception of new bearings without substantial restoration work being effected upon the worn bearing surfaces.

Especially in view of the very heavy-duty nature of axle housings of trucks and the tractors of tractor-trailer units, as well as the axles of the trailers of such tractor-trailer units being very heavy and cumbersome, it has been necessary heretofore to remove either the axle housings or the axles per se in order to enable a repair mechanic to restore the worn material to original dimensions by depositing replacement metal by welding procedures. This results in an uneven outer surface for the bearing. In order to provide an outer bearing surface for the bearing of precise dimensions, it is essential under current procedures to completely remove the axle housing and/or axles from the truck or unit in which they have been mounted and support the same suitably upon metal-cutting lathes, or the like, in order to reduce the material which has been added by welding procedures to accurate dimension suitable to receive the inner race of a roller bearing or the like.

Dismantling such axle housings and axles from the vehicles in which they have been mounted is an expensive and time-consuming procedure, which, incidentally, lengthens the time in which the vehicle is out of commission and is unable to haul payloads. Thus, not only is the repair expense incurred but the time in which the vehicle is out of commission ultimately adds to the cost of operation of the same and thereby increases the repair cost.

SUMMARY OF THE INVENTION

It is the principal object of the invention to provide a grinding machine which may be used upon an axle housing or an axle of a trailer unit, for example, upon which restorative metal has been added by welding procedures and in regard to the grinding of an external bearing surface thereon, it may be achieved either while the axle housing or axle remains in place upon a truck, a tractor unit, or upon a trailer; or if desired, the housing or axle may be removed from the vehicle and the grinding machine readily may be employed to produce an accurate bearing surface upon the outer end of the housing or axle to desired tolerances and smoothness for the reception of new bearings thereon.

It is another object of the invention to provide a grinding machine which is relatively simple in nature and readily can be attached to the axle housing of a truck or tractor unit, or to the axle of a trailer unit, whether mounted upon the vehicle or removed therefrom, and is provided with power means for automatically operating a grinding wheel and moving the same about the axis of the axle housing or axle, while additional means are provided for moving the grinding wheel in an axial direction, whereby a highly satisfactory cylindrical bearing surface is provided upon the renewed portion of the axle housing or axle for the reception of a new bearing unit thereon.

It is a further object of the invention to provide gearing mechanism of unique nature, which is driven by power means to achieve automatic rotation of the grinding wheel around the axis of the axle housing or axle and also permit said aforementioned axial movement of the grinding wheel, which preferably is achieved by manual means.

It is still another object of the invention to provide various types of adjustable mechanisms and positioning means which permit the grinding machine to be adapted to grind bearing surfaces upon axle housings and stationary axles for trailer units, for example, of various dimensions and lengths, said grinding means also being adapted to grind restored, operative surfaces upon either the inner or outer bearing surfaces of such housings and stationary axles.

BRIEF DESCRIPTION OF THE DRAWINGS

FIG. 4 is an enlarged, fragmentary, horizontal section of the view showing details of the gearing of the driving mechanism by which the jig frame of the machine is rotated about the axis of the axle bearing surface which is being ground by the machine.

FIG. 5 is a fragmentary transverse sectional view of a portion of the gearing mechanism shown in FIG. 4 as seen on the line 5—5 thereof.

DESCRIPTION OF THE PREFERRED EMBODIMENTS

Figure 1:
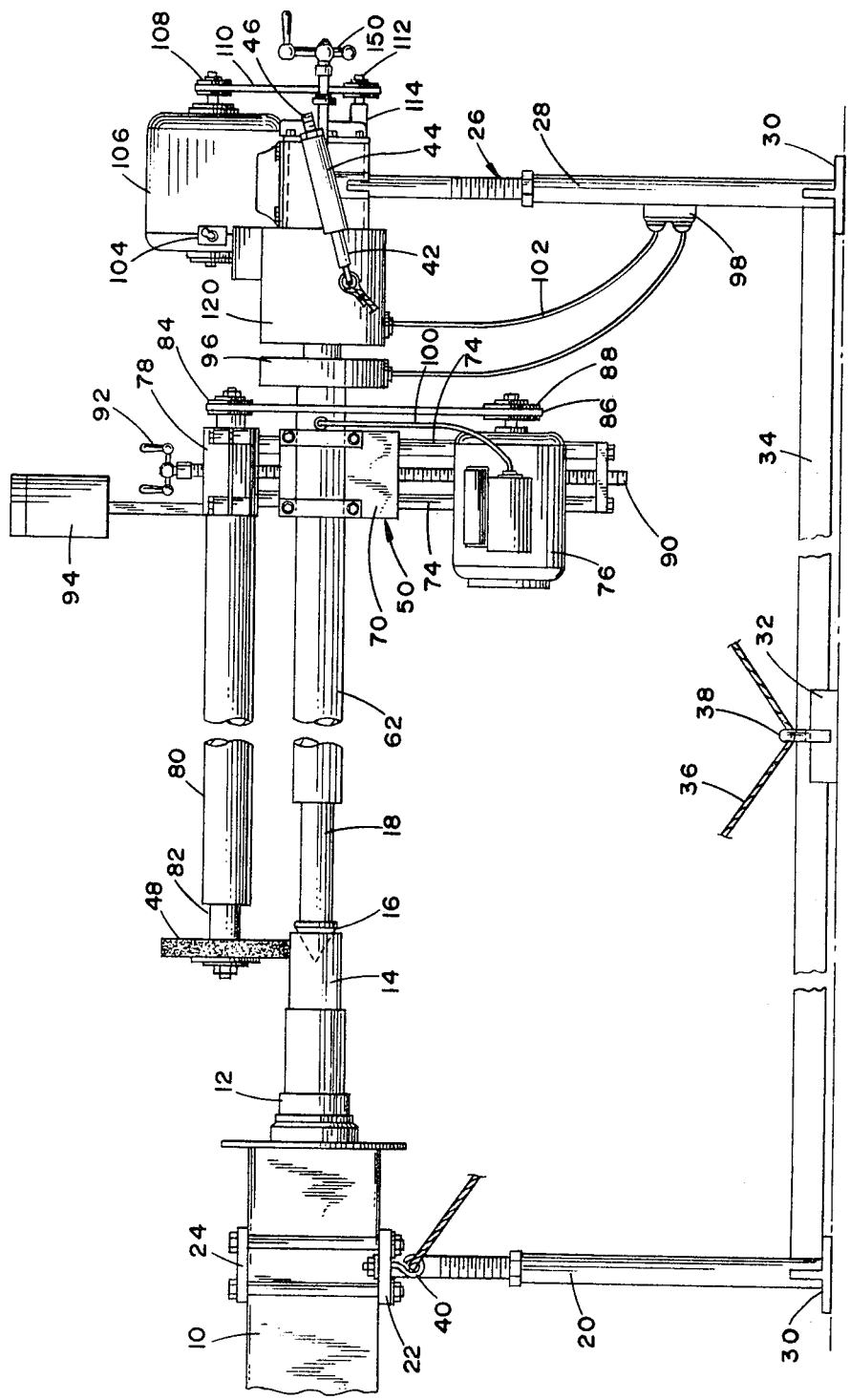
FIG. 1 is a fragmentary side elevation of an exemplary grinding machine embodying the principles of the present invention and partly broken away to foreshorten the view, said machine being illustrated in operative engagement with one end of an exemplary axle for a trailer unit.

Referring to FIG. 1 and especially the left-hand end thereof, it will be seen that the fragmentary end portion 10 of the axle of an exemplary trailer unit is illustrated. Each end of such an axle is provided with an inner bearing surface 12 and an outer bearing surface 14. Under certain circumstances, the inner bearing surface 12 may require repair, but much more frequently, the outer bearing surface 14 requires restoration which usually is of a rather extensive nature.

Depending upon the degree of misuse, such as failure to lubricate the outer bearing, substantial portions of the original bearing surface 14 may be worn away, and said bearing surface actually may be misshapen, due particularly to the very extensive heats which are sometimes generated incident to a bearing being run for long distances without lubrication and after the bearing actually has become destroyed. Accordingly, it is essential that such bearing surfaces be restored, primarily by adding thereto metal which has been worn away, due to such misuse, or long periods of reasonably satisfactory use. Especially after the roller bearing unit requires replacement upon an axle or the outer end of an axle housing, it is essential that the bearing surfaces be in suitable condition to receive new bearings.

Regardless of whether the bearing surface to be reconditioned is upon the outer end of an axle housing or the end of an axle per s, such as an axle on a trailer unit of a tractor-trailer rig, the portions thereof upon which the external bearing surfaces 12 and 14 are provided are tubular. Under conditions of misuse however, the tubular portion and especially the outer end upon which the outer bearing surface 14 is located may be bent or otherwise misaligned with respect to he axis of the axle or axle housing. Therefore, the restoration operation initially comprises adding required metal to one or both of the bearing surfaces by conventional welding procedures until somewhat more than the required diameter for such bearing surfaces, and especially the outer bearing surface 14, are provided.

The next operation is to utilize appropriate gaging and measuring apparatus, not shown, to establish the precise geometric the center for the outer bearing surface 14 and prepare the end surface thereof to have a conical shape extending inwardly of the tubular end of the axle or axle housing. Such surface is for purposes of receiving the conical tip 16 of a chuck shaft 18, which comprises part of the grinding machine of the present invention. In order to position the grinding machine of the present invention accurately with respect to the bearing surfaces 12 and 14, however, the outer end of the axle or axle housing 10 is securely clamped to the upper end of a supporting jack 20, which has a clamping head 22 on the upper end thereof that is vertically adjustable. A clamping strap 24 is clamped by suitable bolts to the clamping head 22 in order to secure the axle or axle housing 10 firmly to the jack 20 at a desired vertical position.

Figure 2:
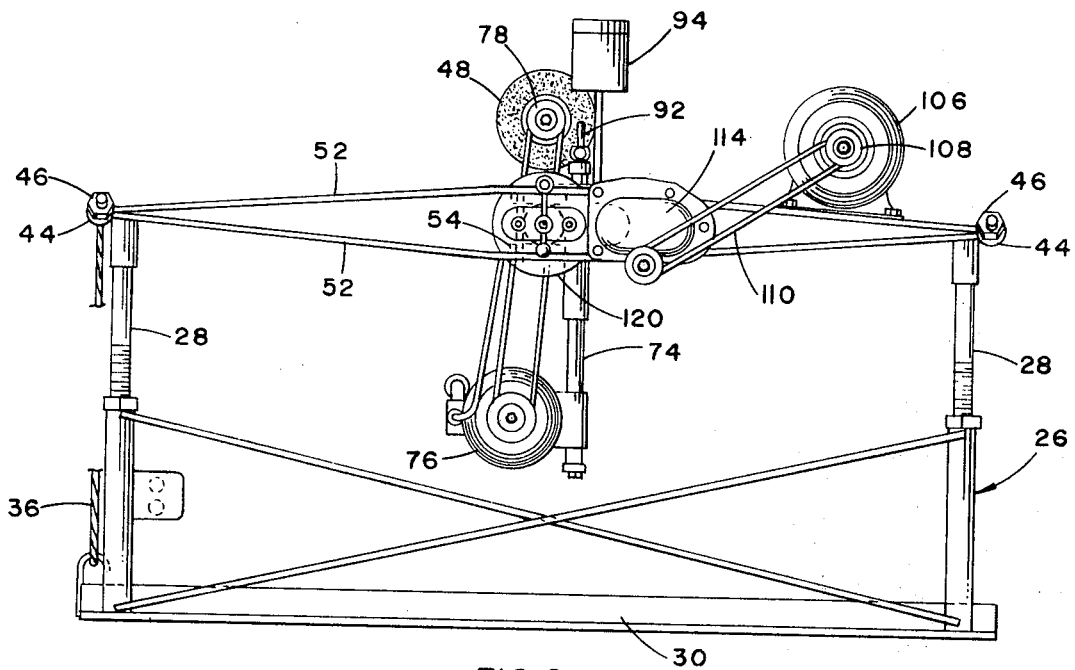
FIG. 2 is an end view of the machine shown in FIG. 1 as seen from the right-hand end thereof.
Figure 3:
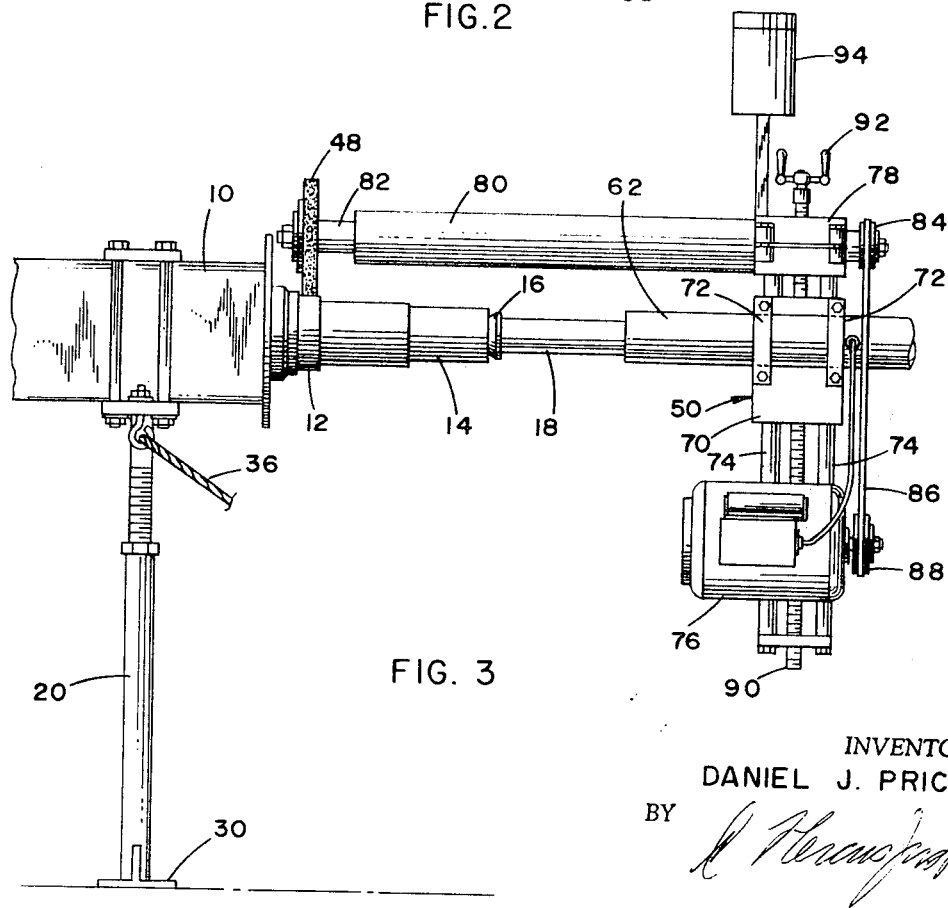
FIG. 3 is a fragmentary vertical elevation of the machine shown in FIG. 1, but illustrated with the grinding wheel in engagement with a different portion of the axle of a trailer unit from that shown in FIG. 1.

The grinding machine also includes a stationary frame 26, which includes a pair of spaced, vertically adjustable posts 28, best shown in FIG. 2. The lower ends of the post 28 are secured in fixed relationship by a horizontal bottom frame member 30. If the machine is of such a nature as to be permanently established in a garage or the like, the frame member 30 may be anchored to the floor of the garage. Similarly, an intermediate anchor member 32 likewise may be secured either to the floor or a longitudinal frame member 34 which extends between the outer ends of frame member 30 and to the lower portion of supporting jack 20. A pair of such members will be required under such circumstances and respectively will extend from the outer ends of bottom frame member 30 toward the base of supporting jack 20. Each of said members will have an intermediate anchor member 32 thereon.

Appropriate adjustable securing means for fixedly positioning the chuck shaft 18 in operative, coaxial relationship with respect to the bearing surfaces 12 and 14 are provided on the frame means referred to above. Such securing means comprises heavy-duty tension members such as either chains or cables 36, which extend directly upward or at an angle in opposite directions from each of the intermediate anchor members 32 which, for example, may be adjacent jack 20 or spaced therefrom, as shown, and are provided with an eyelet 38 through which the heavy-duty tension members 36 extend. Chains are preferred even though cables are shown. The opposite ends thereof respectively are affixed either to an eyelet 40 connected to clamping head 22 or in any other suitable way to the main part of the axle or axle housing 10, or spring of a truck if the axle or axle housing are still connected thereto or otherwise. The chain then is connected to the threaded adjusting bolt or eyelet 42 which extends through a suitable sleeve 44 in each of the opposite ends of stationary frame 26 as can be best seen in FIG. 2.

Adjustable nuts 46 are provided on the outer end of each of the bolts 42. Accordingly, by means of the vertical adjustability of the supporting jack 20 and the vertical posts 28, as well as the flexible connecting means 36, the opposite end of chuck shaft 18 from that which has the conical tip 16 thereon, to be described in detail hereafter, may be suitably adjusted in vertical and horizontal planes until the chuck shaft 18 is precisely coaxial with the bearing surfaces 12 and 14. When this arrangement has been achieved and conventional locking nuts on the adjustable jack and posts have been set, together with the tightening of the nuts 46 on bolts 42, the grinding machine will be accurately positioned with respect to the bearing surfaces which are to be ground in order to produce accurate restored bearing surfaces which are to receive new antifriction roller bearings or the like.

In accordance with conventional practice, and particularly since the inner bearing surface 12 only infrequently requires restoration or repair, the coaxial alignment of the grinding machine with the bearing surfaces may be tested by adjusting the machine, by means also described hereinafter, to position the grinding wheel 48 in very light contact with the inner bearing surface 12 and revolve the jig frame 50 which supports the grinding wheel 48, about the axis of the chuck shaft 18 and inspect the engagement of the grinding wheel 48 relative to bearing surface 12 to ascertain that substantially uniform light contact is made around the entire circumference of the inner bearing surface. Assuming, for example, that it is primarily the outer bearing surface 14 which required restoration and the necessary restoration metal has been added thereto by welding procedures, the grinding of a finished and precise outer bearing surface 14 may now proceed by the mechanism now to be described.

The stationary frame means 26 extends transversely to the axis of the chuck shaft 18 as best seen in FIG. 4, wherein portions of horizontal frame members 52 are shown in superimposed relationship. Said members are better illustrated in FIG. 2. For simplicity, they may be formed from steel strips about ½ inch thick and 3 inches wide. The outer ends are welded, for example, to each other and to the sleeves 44. Said outer ends also are fixedly connected to the upper ends of the threaded adjustable posts 28 as is seen in FIG. 2. Intermediately of the ends of the frame members 52 and fixedly secured thereto such as by welding, is a metal block 54, best shown in FIG. 4, which also constitutes a threaded member in that it has a central bore, which is threaded for engagement with the threads on a feed shaft 56, for purposes to be described.

By further reference to FIG. 4, it will be seen that the end portion of chuck shaft 18, which is opposite that which has the conical tip 16 thereon, is provided with an axial bore 58 within which the inner end of the feed shaft 56 extends, said inner end preferably having a slidable guide plug 60 thereon to steady the operation of the shaft 56. It also will be seen that the terminal end of said chuck shaft 18 is fixed to a suitable bore within the metal block 54 so as to be stationary relative thereto. Accordingly, when the grinding machine is anchored with respect to an exemplary axle or axle housing, the chuck shaft 18 and the stationary frame 26 are fixed relative thereto and substantially all of the additional components of the grinding machine by which the bearing surfaces are reconditioned are movable relative to the fixed members.

Referring still further to FIG. 4, a supporting sleeve 62, which is foreshortened in said view, is of larger diameter than chuck shaft 18 and it is coaxial therewith. A suitable journal bearing 64 is mounted in the outer end of sleeve 62 for slidable and rotatable engagement relative to chuck shaft 18. Similarly, an additional journal bearing and anchor member 66 is disposed within the opposite end of sleeve 62. Said opposite end of the sleeve also has a transverse annular flange 68 fixed thereto.

The principal function of supporting sleeve 62 is to support the jig frame 50 by which the grinding wheel 48 is supported in order that the jig frame 50 may be moved both axially upon and rotatably about the chuck shaft 18. The jig frame 50 essentially comprises a baseplate 70, having an appropriate seat in one face thereof to receive a portion of the outer surface of supporting sleeve 62. Clamping straps 72 adjustably connect the baseplate 70 to the sleeve 62. Baseplate 70 also slidably supports a pair of parallel guide rods 74, within appropriate conventional bearings, not shown. The rods 74 are for two principal purposes. One is to support the electric motor 76, preferably in an adjustably fixed position upon the rods. The other purpose is to support the connecting sleeve 78, which is either fixed to or comprises one end of bearing sleeve 80, within which shaft 82 rotates within a suitable bearing, not shown, and supports the grinding wheel 48 on one end thereof. The opposite end of shaft 82 has a sheave 84 thereon, which is driven by a belt 86 that extends around the drive sheave 88 on motor 76.

Baseplate 70 also is provided either with a threaded bore, or a boss having a threaded bore therein, not shown, through which threaded shaft 90 extends. Said shaft is rotatably connected relative to connecting sleeve 78 in a manner which prevents axial movement of the shaft relative to this sleeve, whereby upon manually rotating shaft 90 by means of handcrank 92, the guide rods 74 and also the motor 76 and bearing sleeve 80 which are connected thereto are moved in a direction transverse to the axis of chuck shaft 18 in order to dispose the surface of the grinding wheel 48 at desired radial distances toward and from the axis of the bearing being ground by said wheel.

The degree of cut made by each pass of the grinding wheel 48 will depend upon the grade of coarseness of the grinding wheel. One operative example of grinding machine now in use is capable of readily grinding approximately 0.050 inch at each cut or pass of the wheel relative to the grinding surface. Such dimension is merely mentioned by way of illustration rather than restriction, however. Particularly where the bearing surface has been ground to within a few thousandths of the desired final dimension, lighter cuts are taken, and if desired, such final cuts may be made with a finer grade of wheel in order to produce at least a very smooth or semipolished surface upon the axle housing or axle. To facilitate the rotation of the jig frame 50 and the components carried thereby about the axis of chuck shaft 18, especially to substantially equalize the weight imposed upon the same by motor 76, an appropriate counterweight 94 extends outward from the opposite end of the jig frame from that upon which the motor 76 is mounted.

The power to operate the electric motor 76 is provided by a suitable commutator 96 relative to which the supporting sleeve 62 is rotatable. The commutator may derive current from a suitable outlet box 98 shown in FIG. 1, for example, and an electric conduit 100 is connected between suitable leads, not shown, on sleeve 62 and motor 76 by conventional means. The outlet box 98 also may be used to furnish current by means of another electric conduit 102 which extends from the box to a switch 104, which controls the operation of another electric motor 106 by which the jig frame 50 is automatically and continuously rotated, at a desired and suitable speed about the axis of the chuck shaft 18. The drive means by which this is accomplished now will be described.

Motor 106 has a drive sheave 108 which is connected by belt 110 to a sheave on driven shaft 112 on gear reduction unit 114. The output shaft 116 of said unit is supported by an appropriate bearing 118 which is fixed to the frame members 52, as shown in FIG. 4. Said frame members also support the motor 106. By way of example, rather than restriction, in the aforementioned operative grinding machine, the reduction afforded by unit 114 is of the order of 1 to 90. A gear housing 120, see FIG. 1, encloses the interengaging driving gears which are described as follows:

Referring to FIG. 4 and FIG. 5, which are views in which the gear housing 120 has been omitted for purposes of clarity and illustration, the output shaft 116 is shown affixed to and drives a pinion gear 122. Fixed to the inner face of metal block 54, by appropriate bolts, is a faceplate 124 which preferably is circular and of greater diameter than a circular bearing surface 126 formed on metal block 54 and of smaller diameter than said block 54, whereby an annular channel is formed which rotatably supports a ring gear 128, which is shown in section in FIG. 4. Pinion gear 122 meshes with said ring gear 128 and rotates the same, preferably at slow speed, about the axis of block 54 and chuck shaft 18, which is fixed thereto.

Rotational drive of the jig frame 50 about the axis of chuck shaft 18 is achieved by means of a plurality of parallel and circumferentially spaced guide shafts 130, which are threadably connected at one end to ring gear 128 at circumferentially spaced locations. They are supported in cantilever manner and, at the opposite ends thereof, project through complementary holes 132 formed in annular flange 68 on supporting sleeve 62. Such arrangement therefore ensures positive rotation of the supporting sleeve 62 upon the chuck shaft 18 and correspondingly effects rotation of the jig frame 50 about the axis of chuck shaft 18, while permitting axial movement of said rotatable members relative to chuck shaft 18. This is due to the ability of the annular flange 68 to move axially with respect to guide shafts 130 but relative rotatable movement therebetween is prevented. Such axial movement of the supporting sleeve 62 and all elements on the jig frame 50 which are supported thereby, in opposite directions, is effected by the following mechanism.

Journal bearing 66 is fixed relative to supporting sleeve 62 and is rotatable upon chuck shaft 18. The end of said bearing nearest horizontal frame members 52 preferably is reduced in diameter to form a short journal bearing 134. Fixed to the outer end thereof is a cap plate 136 which is of a larger diameter than the bearing 134 and is secured thereto by suitable screws. This arrangement forms an annular channel which rotatably receives a circular anchor member 138, which is maintained nonrotatable by being connected to the inner ends of a pair of push-pull rods 140 which extend through bearings 142 in faceplate 124 and metal block 54. As explained above, the feed shaft 56 is threaded intermediately of the ends thereof and engages complementary threads within a central bore 144 in block 54. Feed shaft 56 also has a flanged member 146 fixed thereto which has a transverse tie bar 148 rotatively mounted thereon, but the flanged nature of member 146 prevents relative axial movement therebetween. The opposite ends of rods 140 from those which are connected to anchor member 138 are threadably connected to the tie bar 148, as shown in FIG. 4, so as to be fixed thereto.

The outer end of feed shaft 56 has a handcrank 150 connected thereto. As the handcrank is rotated in opposite directions, the feed shaft 56 will correspondingly be moved axially in opposite directions due to the threaded bore 144 engaging the threads on shaft 56. Simultaneously, the rods 140 will correspondingly be moved axially to propel the anchor member 138 in similar axial directions and thereby cause the supporting sleeve 62 and the jig frame 50, together with all of the mechanism mounted thereon, to be moved in similar axial directions. This results in the grinding wheel 48 being moved axially with respect to the bearing surfaces 12 or 14 to be ground thereby. It has been found from experience that such axial movement of the grinding wheel is best effected by manual movement of the crank member 150. During such operation, there is a certain advantage to such manual movement which results in the operator obtaining a "feel" of the operation of the grinding wheel, as well as being able to visually observe its operation.

After each axial movement or "cut" of the grinding wheel by the aforementioned mechanism for the full length of the bearing surface to be ground, followed by retraction of the grinding wheel to starting position, the handcrank 92 is operated to move the grinding wheel radially inwardly for an additional "cut" which is effected as the grinding wheel is progressively moved axially for the full length of the bearing surface.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A grinding machine for grinding an exterior cylindrical bearing surface upon the outer end of an axle or axle housing of an automative vehicle or trailer comprising in combination, a chuck shaft having one end adapted to be centered upon the outer end of an axle or axle housing stationarily, fixed frame means adapted to be positioned stationarily relative to said axle or axle housing and rigidly support the opposite end of said chuck shaft coaxially with said axle or axle housing, a jig frame supported by said chuck shaft for both axial and rotatable movement, a grinding wheel, a shaft rotatably supported adjacent one end by said jig frame precisely parallel to said chuck shaft and the axis of said axle or axle housing and the other end of said shaft supporting said grinding wheel, means to move said jig frame and grinding wheel axially in opposite directions along said chuck shaft to dispose said grinding wheel upon the bearing surface of an axle or axle housing to be ground thereby, means to rotate said jig frame and grinding wheel about the axis of said chuck shaft, power means carried by said jig frame and connected to said grinding wheel shaft to rotate said grinding wheel, and additional power means interconnected to said jig shaft and operable to rotate the same automatically around the axis of said chuck shaft incident to said grinding wheel progressively operating upon the bearing surface of an axle housing.

2. The grinding machine according to claim 1 in which said power means comprises an electric motor fixedly mounted relative to said stationary frame which supports the opposite end of said chuck shaft, said power means also including means to interconnect said motor relative to said jig frame.

3. The grinding machine according to claim 2 in which said means to connect said motor to said jig frame includes gear means and guide rods interconnected to each other and operable to effect rotation of said jig frame and permit longitudinal movement thereof in opposite directions thereof along said chuck shaft.

4. The grinding machine according to claim 3 in which said gear means includes a ring gear rotatable about a bearing fixedly interconnected to said stationary frame for said chuck shaft and supported thereby and said guide rods being connected to said ring gear for said rotation of said jig frame.

5. The grinding machine according to claim 4 further including a gear reduction unit interconnected to said power means on said stationary frame, and said gear means for effecting rotation of said jig frame including a driving gear fixed to and driven by said gear reduction unit, said driving gear engaging said ring gear to drive the same about its axis.

6. The grinding machine according to claim 1 in which said means to move said jig frame and grinding wheel axially along said chuck shaft comprises a feed shaft which extends through and is threadably connected to a female threaded member fixed relative to said stationary frame which supports said opposite end of said chuck shaft, said threaded member being provided with a ring gear coaxial therewith and rotatable about the axis thereof, and said grinding machine further including gear means driven by said additional power means and meshing with said ring gear and operable thereby automatically to effect said rotation of said jig frame around the axis of said chuck shaft.

7. The grinding machine according to claim 6 in which said female threaded member has a substantially circular cross section and is provided adjacent one end with a circular channel comprising a bearing within which said ring gear revolves.

8. The grinding machine according to claim 7 in which one sidewall of said circular channel comprises a circular faceplate detachably connected to said female threaded member to permit mounting said ring gear within said channel.

* * * * *